Sept. 9, 1947.   L. W. CHUBB, JR   2,427,259
JIG FOR PREDETERMINEDLY MARKING POLARIZING SCREENS
WITH RESPECT TO THEIR TRANSMISSION AXES
Filed Aug. 27, 1945
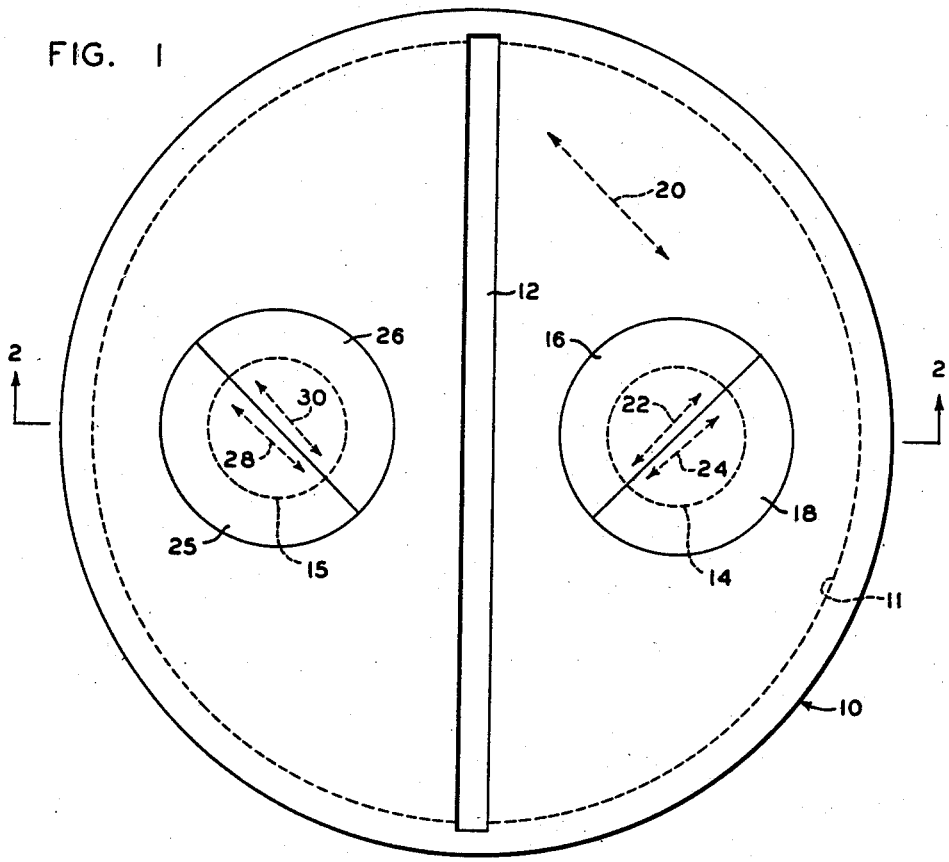
FIG. 1
FIG. 2
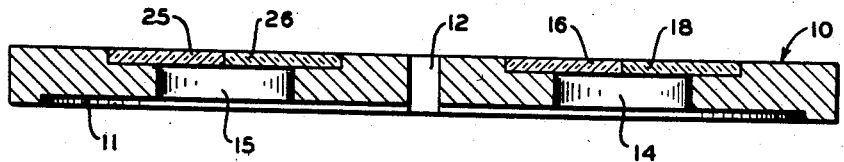
INVENTOR
Lewis W. Chubb, Jr.
BY
Donald R. Brown
Attorney Patented Sept. 9, 1947

2,427,259

UNITED STATES PATENT OFFICE 2,427,259

JIG FOR PREDETERMINEDLY MARKING POLARIZING SCREENS WITH RESPECT TO THEIR TRANSMISSION AXES

Lewis W. Chubb, Jr., Sharon, Mass., assignor to Polaroid Corporation, Cambridge, Mass., a corporation of Delaware Application August 27, 1945, Serial No. 612,950

4 Claims. (Cl. 88—65)

1

This invention relates to jigs or similar devices particularly adapted for use in marking or scoring light-polarizing materials.

It is a primary object of the invention to provide a jig for use in applying to a light-polarizing element a mark bearing a predetermined relation to the polarizing, or transmission, axis of said element.

Another object is to provide a device for the above purpose particularly adapted for use in marking or scoring protective cover plates of light-polarizing filters for incorporation with vehicle headlights so that said cover plates may be fractured to reduce or minimize photoelastic strains developed therein when in use.

A further object is to provide a device having the above characteristics and including one or more light-polarizing elements.

Other objects and advantages will in part appear and in part be pointed out in the course of the following detailed description of one or more embodiments of the invention, which same are given as non-limiting examples in connection with the accompanying drawings, in which:

Figure 1 is a view of one side of a jig embodying a form of the invention; and

Figure 2 is a section taken substantially on the line 2—2 in Fig. 1.

The device shown in the drawings is a form of the invention particularly designed for use in conjunction with light-polarizing filters for incorporation with an automobile headlight. In practice such filters generally comprise a layer of light-polarizing material laminated between two layers of glass. If the outermost of said glass layers is scored and cracked, for example in such manner as to separate it into four substantially equal sectors, it will be found to show negligible photoelastic effects even when utilized under conditions of relatively high heat such as are met with in a vehicle headlight. The form of the invention shown in the drawings is designed particularly for use in said scoring operation, with the objective of insuring that said scored lines will bear a predetermined relation to the polarizing axis of the filter and can thereby be useful as a guide to the correct positioning thereof on the headlight.

The main body 10 of the jig shown in the drawings is preferably formed of metal or other suitable rigid material and is formed on one surface thereof with a circular recess 11 adapted to accommodate a headlight filter. Recess 11 is substantially bisected by a transverse slot 12 extending completely through jig 10. A pair of

2 viewing apertures 14 and 15 also extend completely through jig 10, and each is fitted with a polarizing element the particular nature and arrangement of which may be varied to a considerable extent. If a high degree of accuracy in marking is desired, it is preferred to use polarizing elements of the split-field type, and the element for aperture 14 is accordingly shown as comprising two semi-circular polarizing segments 16 and 18 mounted within a complementary recess in the opposite surface of jig 10 from recess 11 and having their polarizing axes at a predetermined angle to each other as will be explained.

In the particular application of the invention being described, it is desired to score a polarizing headlight filter along a line bearing a predetermined relation to the polarizing axis of said filter. In Fig. 1 arrow 20 represents the polarizing, or transmission, axis of such filter and is illustrated as arranged at 45° from the vertical in counterclockwise direction, i. e., extending from upper left to lower right. The axes of split-field polarizer segments 16 and 18 are then preferably arranged at angles of slightly more or less than 45° to the vertical in a clockwise direction, i. e., extending from upper right to lower left, as is illustrated by arrows 22 and 24. Thus, for example, arrow 22 may be at an angle of 42° to the vertical and arrow 44 at an angle of 48° to the vertical, in which case it will be seen that the line bisecting the angle between arrows 22 and 24 will be at 45° to the vertical and substantially perpendicular to arrow 20. When, therefore, the device is utilized to mark a headlight filter as above described, it is merely necessary to insert said filter in recess 11, rotate it before a light source until its axis is approximately crossed with the axes of polarizers 16 and 18 and then adjust it carefully until the two fields defined by said polarizers are at equal intensity. In such position it will be seen that the axis of the filter will be at 90° to the line bisecting the angle defined by arrows 22 and 24, and slot 12 will accordingly lie at exactly 45° to arrow 20. It is therefore only necessary to mark the filter properly in that position, and this operation may readily be combined with the scoring operation by passing any suitable glass-cutting implement such as a conventional glass cutter along the length of slot 12 in contact with the face of the filter in recess 11. When, therefore, the filter is subsequently mounted on the headlight, it is merely necessary to take precautions that the resulting scored line therein is positioned vertically, and this will insure proper orientation of the polarizing axis of said filter.

Aperture 15 may be used in providing a scored line at right angles to the above first scored line. In this case aperture 15 will be similarly fitted with a split-field polarizing element comprising polarizing segments 25 and 26 having their axes arranged at a small angle to each other and at equal angles to a line perpendicular to the line bisecting the angle between arrows 22 and 24, as is indicated by arrows 28 and 30. With this arrangement, it is merely necessary to rotate the filter within recess 11 through approximately 90° from its first position, adjust it accurately until the two halves of the field defined by polarizing segments 25 and 26 balance in degree of brightness, and repeat the above marking or scoring operation.

Many variations of the above described construction and of the mode of operation may be made without in any way departing from the scope of the invention. For example, aperture 15 and its associated polarizing element may be eliminated and only aperture 14 utilized without materially affecting the operation of the illustrated embodiment of the invention. That is to say, if the first scored line is accurately positioned with respect to the filter being marked, it may be used as the guide line for mounting the filter, and the other scored line may be made independently at approximately 90° thereto without affecting the desired operation of the filter.

It is not essential to use a split-field polarizing element. A single polarizer having its transmission axis at 45° to slot 12 will operate in similar fashion, but a high degree of accuracy is more easily obtained with a split-field element than with a single polarizer. The angle between the axes of the two halves of the split-field element is in no way critical provided the bisector thereof bears the desired predetermined relation to slot 12. Many marking devices other than a glass cutter may be used, such for example as a sand blast or a blast of any other suitable marking material such as chalk, paint or the like. In another variation, any suitable etching device may be mounted to run in slot 12 or on any other track means bearing a predetermined relation to the axis of the polarizing filter. It will also be readily apparent that the size and shape of the body of the jig or of the work-holding recess or other guide device may be varied in size or shape to accommodate different polarizing filters to be marked. Similarly, the location and length of slot 12 may be varied if desired, and the shape may be changed to any desired directional form, for example a diamond or arrow, capable of indicating the direction of the polarizing, or transmission, axis of the marked filter.

Since certain changes may be made in the above article and different embodiments of the invention could be made without departing from the scope thereof, it is intended that all matter contained in the above description or shown in the accompanying drawing shall be interpreted as illustrative and not in a limiting sense.

What is claimed is:

1. A jig of the character described comprising, in combination, a body portion of rigid material, means providing a substantially circular recess in one surface of said body portion, means providing a substantially straight slot through the bottom of and substantially bisecting said recess, means providing a viewing aperture through the bottom of said recess, and a light-polarizing element positioned in said aperture with the polarizing axis thereof at a predetermined angle to said slot.

2. A jig of the character described comprising, in combination, a body portion of rigid material, means providing a substantially circular recess in one surface of said body portion, means providing a substantially straight slot through the bottom of and substantially bisecting said recess, means providing a viewing aperture through the bottom of said recess, and a pair of polarizing elements positioned in side-by-side relation in said aperture with their polarizing axes non-parallel and the bisector of the angle defined by said axes at an angle of substantially 45° to said slot.

3. A jig of the character described comprising, in combination, a body portion of rigid material, means providing a substantially circular recess in one surface of said body portion, means providing a substantially straight slot through the bottom of and substantially bisecting said recess, means providing a viewing aperture through the bottom of said recess, a pair of polarizing elements positioned in side-by-side relation in said aperture with their polarizing axes non-parallel and the bisector of the angle defined by said axes at an angle of substantially 45° to said slot, means providing a second viewing aperture through the bottom of said recess, and a pair of polarizing elements positioned in side-by-side relation in said aperture with their polarizing axes non-parallel and the bisector of the angle defined by said axes at an angle of substantially 90° to said first named bisector.

4. A jig of the character described comprising, in combination with a generally flat body of substantially rigid material having a substantially circular recess in one face and a substantially straight through slot in and substantially bisecting said recess and a viewing aperture extending through the body and within said recess, of a pair of polarizing means positioned in side-by-side relation in said aperture and having their transmission axes non-parallel and so that the bisector of the angle between said axes makes an angle of substantially 45° with said slot.

LEWIS W. CHUBB, Jr.

REFERENCES CITED

The following references are of record in the file of this patent:

UNITED STATES PATENTS

| Number | Name | Date |
|---|---|---|
| 2,351,797 | Young | June 20, 1944 |
| 2,313,143 | Gerber | Mar. 9, 1943 |
| 2,303,967 | Weiner | Dec. 1, 1942 |
| 2,216,490 | Garrett | Oct. 1, 1940 |

FOREIGN PATENTS

| Number | Country | Date |
|---|---|---|
| 478,557 | Great Britain | Jan. 20, 1938 |

OTHER REFERENCES

Serial No. 390,216, Sauer (A. P. C.), pub. Apr. 27, 1943.

Hardy and Perrin text, The Principles of Optics, 1932, page 610, pub. McGraw-Hill Book Co., New York.